United States Patent
Rendahl et al.

(10) Patent No.: US 10,956,968 B2
(45) Date of Patent: Mar. 23, 2021

(54) RELATIVE PRODUCT SIZE VISUALIZATION FROM AN ONLINE STORE WEBSITE

(71) Applicant: International Business Machines Corporation, Armonk, NY (US)

(72) Inventors: Randy A. Rendahl, Raleigh, NC (US); Lisa Seacat DeLuca, Baltimore, MD (US)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 16/124,450

(22) Filed: Sep. 7, 2018

(65) Prior Publication Data

US 2020/0082464 A1    Mar. 12, 2020

(51) Int. Cl.
    *G06Q 30/06*      (2012.01)
    *G06F 3/0484*      (2013.01)

(52) U.S. Cl.
    CPC ..... *G06Q 30/0643* (2013.01); *G06F 3/04845* (2013.01)

(58) Field of Classification Search
    CPC ................ G06Q 30/0601–0645; G06Q 30/80
    USPC ..... 705/26.1, 26.2, 26.25, 26.3, 26.35, 26.4, 705/26.41, 26.42, 26.43, 26.44, 26.5, 705/26.6, 26.61, 26.62, 26.63, 26.64, 705/26.7, 26.8, 26.81, 26.82, 26.9, 27.1, 705/27.2
    See application file for complete search history.

(56) References Cited

U.S. PATENT DOCUMENTS

| | | | |
|---|---|---|---|
| 7,246,085 B2 * | 7/2007 | Kamon | G06Q 10/087 345/660 |
| 8,977,653 B1 * | 3/2015 | Mahkovec | G06F 16/957 707/802 |
| 9,460,464 B2 * | 10/2016 | Krishnan | G06Q 30/0633 |
| 9,940,538 B2 | 4/2018 | Kim et al. | |
| 10,762,482 B2 * | 9/2020 | Bell | G06Q 20/202 |
| 2002/0116298 A1 * | 8/2002 | Kamon | G06Q 30/0643 705/27.2 |
| 2011/0055054 A1 * | 3/2011 | Glasson | G07G 1/0063 705/27.2 |
| 2012/0128240 A1 | 5/2012 | Rothschild | |
| 2013/0311340 A1 * | 11/2013 | Krishnan | G06Q 30/0633 705/27.2 |

(Continued)

FOREIGN PATENT DOCUMENTS

WO      2017186746 A1    11/2017

OTHER PUBLICATIONS

Donegan, P., "LatinonetShopper.com: Business without Borders," Grocery Headquarters, 66.9: (Sep. 2000) 61. (Year: 2000).*

(Continued)

*Primary Examiner* — Nicholas D Rosen
(74) *Attorney, Agent, or Firm* — Diana Roberts Gerhardt; Edell, Shapiro & Finnan, LLC

(57) ABSTRACT

A method, system, and computer program product are provided for visualizing relative sizes of similar products in an online store. A computing device obtains at least two visual representations of the similar products from the online store. A size of each of the visual representations is adjusted to reflect its corresponding respective size relative to other sizes of the similar products. The size-adjusted visual representations are provided for rendering on a display device.

17 Claims, 8 Drawing Sheets

(56) References Cited

U.S. PATENT DOCUMENTS

2016/0364779 A1 12/2016 Kim et al.
2018/0365663 A1* 12/2018 Bell .................. G06Q 10/087

OTHER PUBLICATIONS

Tobii Studio 3.X, Software Release 3.2.1, Tobii Technology AB, Dec. 2012, 24 pages.

Disclosed Anonymously, System to locate product or services of interest within a video or multiple media set and enable extraction of additional information to assist with purchase of the product, an IP.com Prior Art Database Technical Disclosure, IPCOM000247788D, Oct. 6, 2016, 6 pages.

Disclosed Anonymously, Realtime Display of Product Combinations on Mobile Device in Retail Shopping Complex for Advanced Cross Selling, an IP.com Prior Art Database Technical Disclosure, IPCOM000241378D, Apr. 21, 2015, 6 pages.

Disclosed Anonymously, Interactive Method for Smarter Classified and Visualized Information, an IP.com Prior Art Database Technical Disclosure, IPCOM000240622D, Feb. 13, 2015, 14 pages.

Disclosed Anonymously, Technique for Intelligent Catalog-less, media based, real time shopping, an IP.com Prior Art Database Technical Disclosure, IPCOM000236495D, Apr. 30, 2014, 4 pages.

* cited by examiner

```
var smallSize = document.getElementById('smallSizeRepImage');
If(smallSize && smallSize.style) {
        smallSize.style.width = '50px';
}
var medSize = document.getElementById('medSizeRepImage');
If(medSize && medSize.style) {
        medSize.style.width = '100px';
}
var largeSize = document.getElementById('largeSizeRepImage')
If(largeSize = && largeSize.style) {
        medSize.style.width = '150px';
}
```

FIG.7

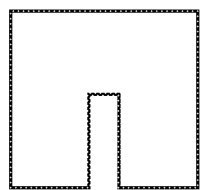
BLUE SHORTS
SIZE: S
PRICE:
$16.00
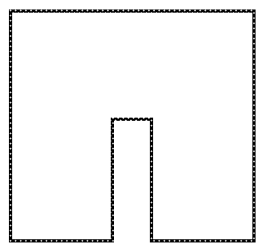
BLUE SHORTS
SIZE: M
PRICE:
$16.00
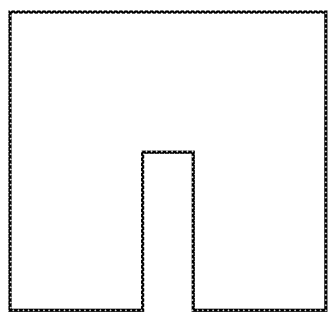
BLUE SHORTS
SIZE: L
PRICE:
$16.00
FIG.8

RELATIVE PRODUCT SIZE VISUALIZATION FROM AN ONLINE STORE WEBSITE

BACKGROUND

1. Technical Field

Present invention embodiments relate to obtaining multiple visual representations of similar products from an online store, adjusting a size of each of the multiple visual representations to reflect relative sizes of the similar products, and providing the multiple size-adjusted visual representations for rendering on a display device.

2. Discussion of the Related Art

Online shopping is a major revenue generator for retailers. Companies are able to sell their products to the world by having a website where customers can view and purchase products. However, when the customers view visual representations of similar products from an online store, the customers may not appreciate how sizes and quantities of the similar products may differ because they are unable to touch and feel the product. For example, a customer viewing multiple visual representations of similar products may not realize size or quantity variations of the products unless the customer carefully reads a description of each of the similar products that may be provided with each of the multiple visual representations. As a result, a customer may easily order a size or quantity of a product that differs from a size or quantity that the customer believes he or she is ordering.

SUMMARY

According to one embodiment of the present invention, a computer-implemented method is provided for visualizing relative sizes of similar products in an online store. A computing device obtains at least two visual representation of the similar products from the online store. The computing device adjusts a size of each of the visual representations to reflect its corresponding respective size relative to other sizes of the similar products and provides the size-adjusted visual representations for rendering on a display device.

According to a second embodiment of the present invention, a computer system is provided for visualizing relative sizes of similar products in an online store. The computing device includes at least one processor and a memory connected to the at least one processor. The memory has instructions recorded therein for the at least one processor to perform a number of steps. According to the steps, at least two visual representations of the similar products is obtained from the online store. A size of each of the visual representations is adjusted to reflect its corresponding respective size relative to other sizes of the similar products. The size-adjusted visual representations are provided for rendering on a display device.

According to a third embodiment of the present invention, a computer program product is provided. The computer program product includes at least one computer readable storage medium having computer readable program code embodied therewith for execution on at least one processor of a computing device. The computer readable program code is configured to be executed by the at least one processor to perform a number of steps. The steps include obtaining at least two visual representation of similar products from an online store. A size of each of the visual representations is adjusted to reflect its corresponding respective size relative to other sizes of the product. The size-adjusted visual representations are provided for rendering on a display device.

BRIEF DESCRIPTION OF THE DRAWINGS

Generally, like reference numerals in the various figures are utilized to designate like components.

FIG. 7 shows an example of HyperText Markup Language that may be used to dynamically adjust visual representations of similar products in some embodiments.

FIG. 8 illustrates an example display of multiple visual representations of similar products that have been size-adjusted to reflect relative sizes of the similar products according to an embodiment of the invention.

DETAILED DESCRIPTION

When shopping at an online store website via a network such as, for example, the Internet, a shopper is presented with a visual representation of a product. Because an online shopper cannot actually see and touch the product, the online shopper may rely on the visual representation and any textual description of the product to determine whether the product is one which the shopper desires to purchase. If multiple similar products are available, multiple visual representations may be presented to the online shopper. Although each of the visual representations may be associated with a different size of the similar products, each of the visual representations may appear to show a same, or similar, size of the product. Unless a description accompanying the visual representations clearly indicates a size of a respective product associated with each of the visual representations, the online shopper may unintentionally order one size of a product when intending to order a different size of the product. In cases in which the online shopper cannot remember a size of a product usually purchased, the online shopper is more likely to order a wrong size of the product. The problem described above is specific to online shopping and the Internet.

In embodiments of the invention, a shopper may use a computing device to request information concerning similar products from a website of an online store. In response to the request, the shopper may be presented with multiple visual representations of the similar products. Each of the multiple visual representations may represent a different size or quantity of the product and may include, but not be limited to, an image, a video, a drawing or an animated visual clip of the product. In addition, a size of each of the multiple visual representations may be scaled to reflect relative sizes of the similar products such as, for example, differences in weight, height, length, and/or other measurable factors.

In some embodiments, a standard size of the similar products may be determined and a size of each respective visual representation may be scaled in relation to the standard size of the similar products.

Figure 1:
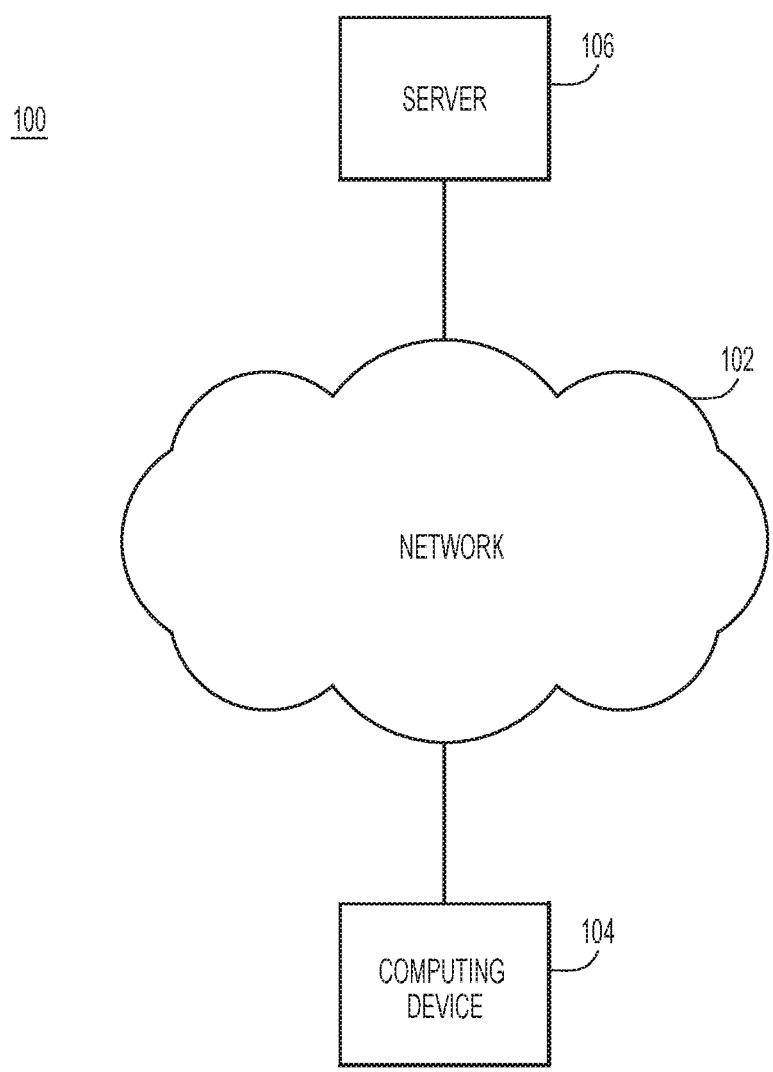
FIG. 1 shows an example operating environment in which various embodiments of the invention may be implemented.

An example environment 100 for use with present invention embodiments is illustrated in FIG. 1. Specifically, environment 100 may include a computing device 104, a network 102 and a server 106. Computing device 104 and server 106 may be remote from each other and may communicate over network 102. Network 102 may be implemented by any number of any suitable communications media (e.g., wide area network (WAN), local area network (LAN), Internet, Intranet, etc.). Alternatively, computing device 104 and server 106 may be local to each other, and communicate via any appropriate local communication medium (e.g., local area network (LAN), hardwire, wireless link, Intranet, etc.). Server 106 may be a single computing device or a server farm including multiple computing devices. Server 106 may include one or more web sites for one or more online stores.

Embodiments of the invention may be implemented on computing device 104 or on server 106. For example, embodiments may be implemented as a browser plugin executing on computing device 104 or may be implemented as a result of changes made to server 106 by the online store or by a third party.

Figure 2:
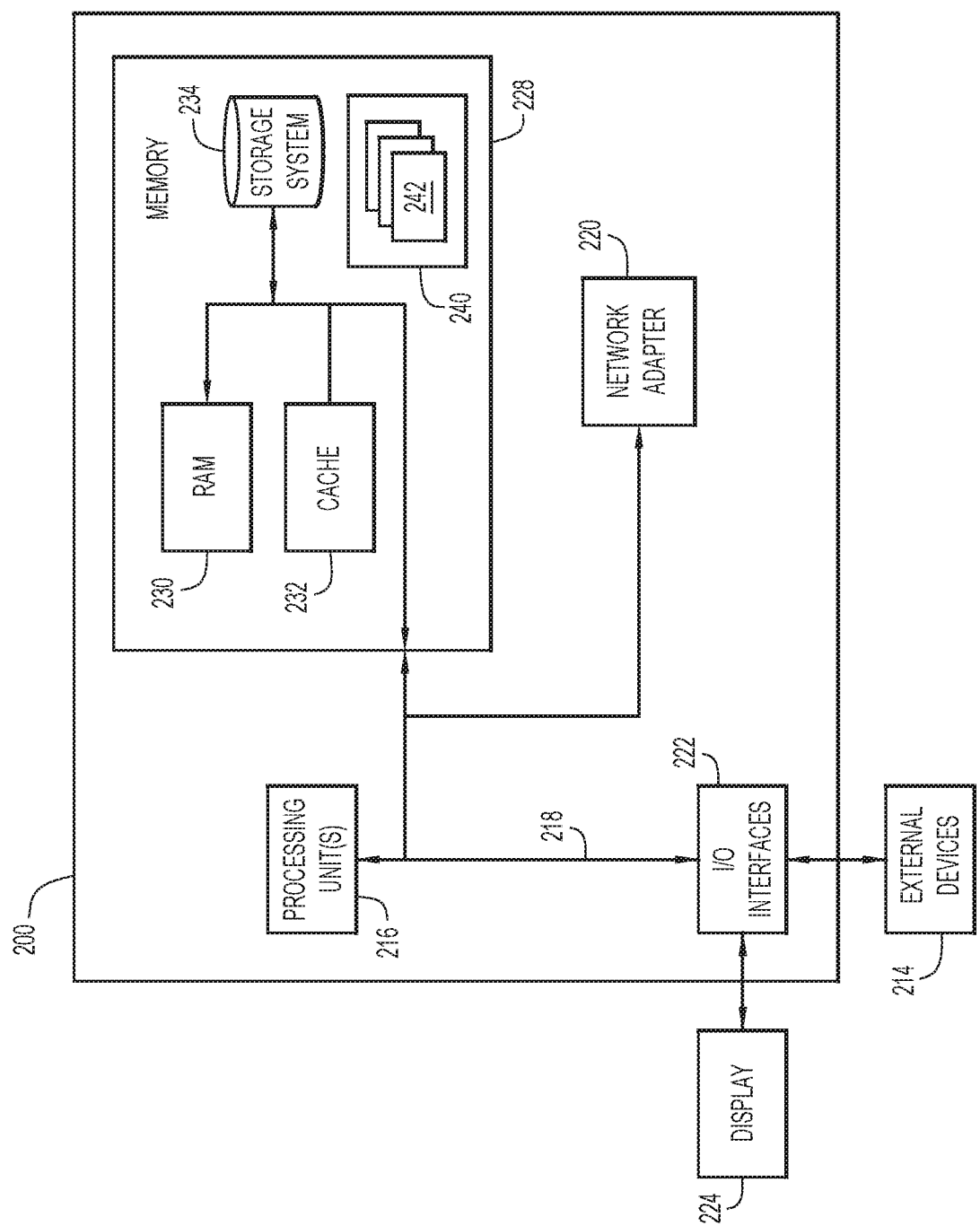
FIG. 2 is a block diagram of an example computer system for implementing a computing device according to embodiments of the invention.

Referring now to FIG. 2, a schematic of an example computer system 200 is shown, which may implement computing device 104 and server 106 in various embodiments. Computer system 200 is shown in a form of a general-purpose computing device. Components of computer system 200 may include, but are not limited to, one or more processors or processing units 216, a system memory 228, and a bus 218 that couples various system components including system memory 228 to one or more processing units 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 200 may include a variety of computer system readable media. Such media may be any available media that is accessible by computer system 200, and may include both volatile and non-volatile media, removable and non-removable media.

System memory 228 can include computer system readable media in the form of volatile memory, such as random access memory (RAM) 230 and/or cache memory 232. Computer system 200 may further include other removable/non-removable, volatile/non-volatile computer system storage media. By way of example only, storage system 234 can be provided for reading from and writing to a non-removable, non-volatile magnetic medium (not shown, which may include a "hard drive" or a Secure Digital (SD) card). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 200 may also communicate with one or more external devices 214 such as a keyboard, a pointing device, one or more displays 224, one or more devices that enable a user to interact with computer system 200, and/or any devices (e.g., network card, modem, etc.) that enable computer system 200 to communicate with one or more other computing devices. Such communication can occur via Input/Output (I/O) interfaces 222. Still yet, computer system 200 can communicate with one or more networks such as a local area network (LAN), a general wide area network (WAN), and/or a public network (e.g., the Internet) via network adapter 220. As depicted, network adapter 220 communicates with the other components of computer system 200 via bus 218. It should be understood that, although not shown, other hardware and/or software components could be used in conjunction with computer system 200. Examples, include, but are not limited to: a microphone, one or more speakers, microcode, device drivers, redundant processing units, external disk drive arrays, RAID systems, tape drives, and data archival storage systems, etc.

Figure 3:
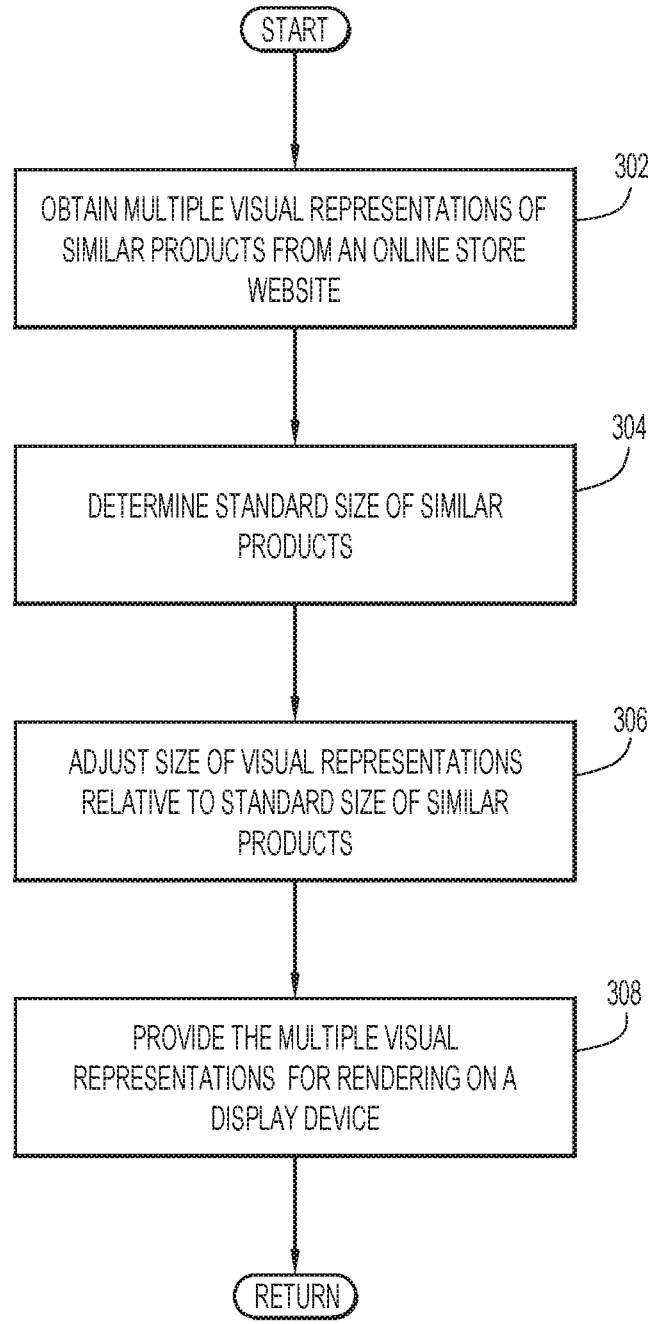
FIG. 3 is a flowchart that illustrates example processing of embodiments of the invention.

FIG. 3 is a flowchart illustrating example processing in embodiments of the invention. The processing may be performed by server 106 or by computing device 104. The process may begin by obtaining multiple visual representations of similar products as well as size information regarding the products from server 106, on which an online store website may reside, in response to a request from computing device 104 regarding the products (act 302).

Next, a standard size of the similar products may be determined (act 304). Any one of a number of methods may be used to determine the standard size of the similar products. For example, the methods may include, but not be limited to: accessing a shopper's purchase history regarding a type of the product and setting the standard size for the similar products to be equal to a size of the type of the product that the shopper usually purchases; determining a median size of the similar products and setting the standard size for the similar products to be equal to the median size; and determining an average of the sizes of the similar products and setting the standard size to the determined average size.

A size of each of the visual representations of the product may be adjusted relative to the standard size of the similar products (act 306) to provide the shopper with a sense of the different sizes of the similar products in relation to each other. For example, if a type of the similar products is dog food and respective sizes are 5 pounds, 10 pounds and 25 pounds, with 10 pounds being the standard size, then the visual representation associated with the 5 pound size may be adjusted to be half the size of the visual representation associated with the 10 pound size. Similarly, the visual representation associated with the 25 pound size may be adjusted to be 2.5 times larger than the visual representation of the 10 pound size. Instead of simply matching a fixed ratio, embodiments of the invention identify dimensions, a weight, or a quantity of a product, calculate ratios and determine a final sizing of a visual representation without a preset context.

The multiple visual representations along with descriptions of the similar products may then be provided for rendering on a display device such as, for example, a display of computing device 104 being used by the shopper (act 308). The shopper may then select a desired size of the similar products to purchase by using, for example, a pointing device. The pointing device may include, but not be limited to, a computer mouse, a finger of the shopper on a touchscreen, keys of a keyboard, etc.

Figure 4:
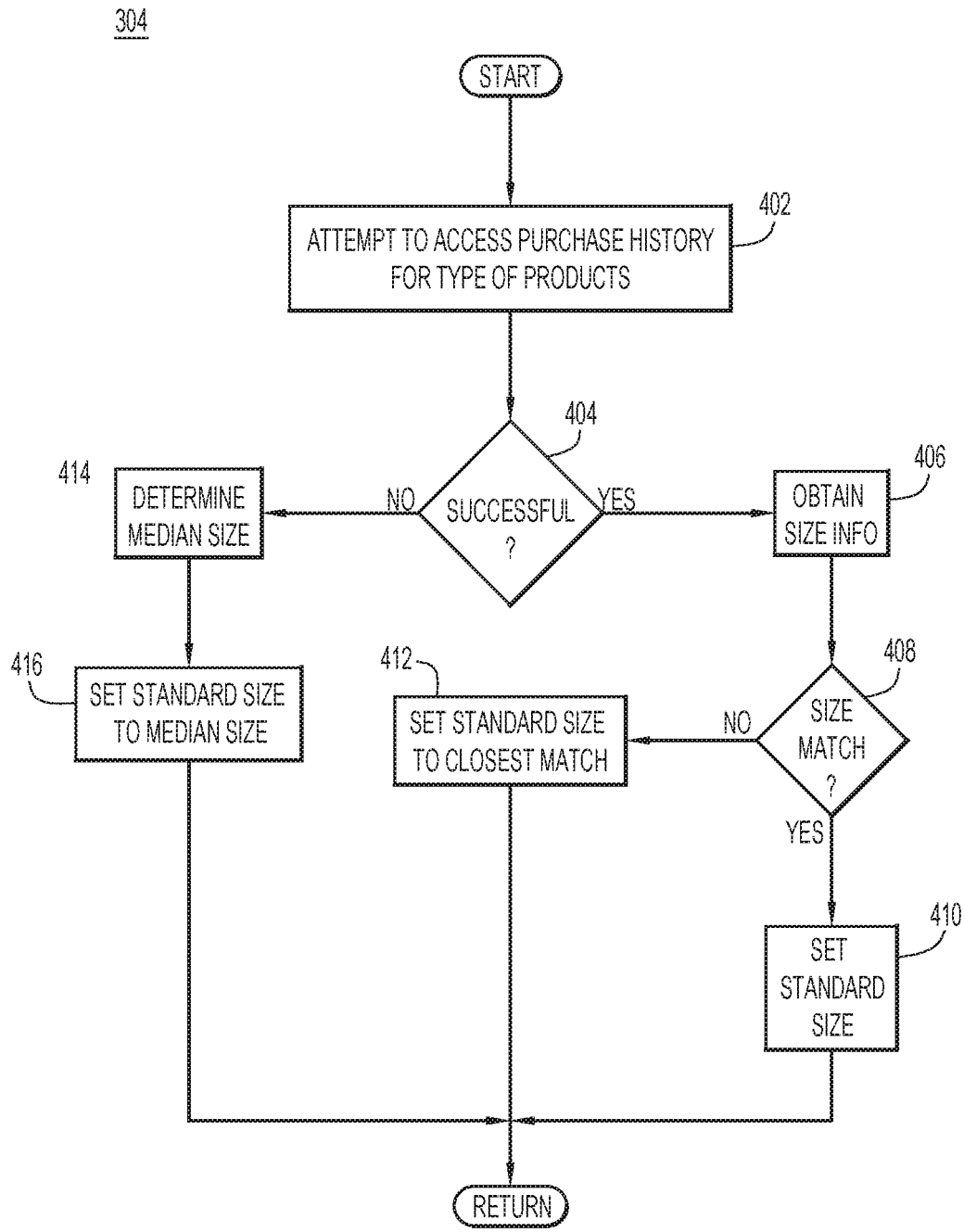
FIG. 4 is flowchart that illustrates example processing for determining a standard size of similar products according to an embodiment of the invention.

FIG. 4 is a flowchart of an example process for performing act 304 of FIG. 3 to determine and set a standard size of similar products. The process may begin by attempting to access a purchase history for a type of the similar products (act 402), assuming a shopper has provided identifying information. For example, the shopper may have identified himself or herself by logging onto an online store's website or other website. In other embodiments, the shopper may provide the identifying information such that a user profile or a shopping history shared by multiple merchants may be accessed. If the shopper had not previously purchased the type of the similar products, or if the shopper had not provided identifying information, the attempt to access the purchase history may be considered unsuccessful.

Next, a determination may be made regarding whether the attempt to access the purchase history was successful (act 404). If the attempt to access the purchase history was successful, size information regarding a size of the type of the similar products usually purchased by the shopper may be obtained (act 406). The obtained size information may be compared with the sizes of the similar products associated with the visual representations to find a match (act 408). If the match is found, the standard size may be set to the size of the type of similar products usually purchased by the shopper (act 410).

If, during act 408, an exact size match is not found, then the standard size may be set to a size of the type of the similar products that most closely matches the size of the type of the similar products usually purchased by the shopper (act 412). For example, if the type of the similar products associated with the visual representations is dog food, which is available from the online store in 5 pound, 10 pound and 25 pound bags, and the shopper usually purchases a 24 pound bag of dog food, then the 25 pound bag of a brand X dog food may be set as the standard size because it is the closest in size to the 24 pound bag that the shopper usually purchases.

If, during act 404, a determination is made that the attempt to access the purchase history of the shopper was unsuccessful, then a median size of the similar products may be determined (act 414) and the standard size may be set to the median size of the similar products (act 416).

Figure 5:
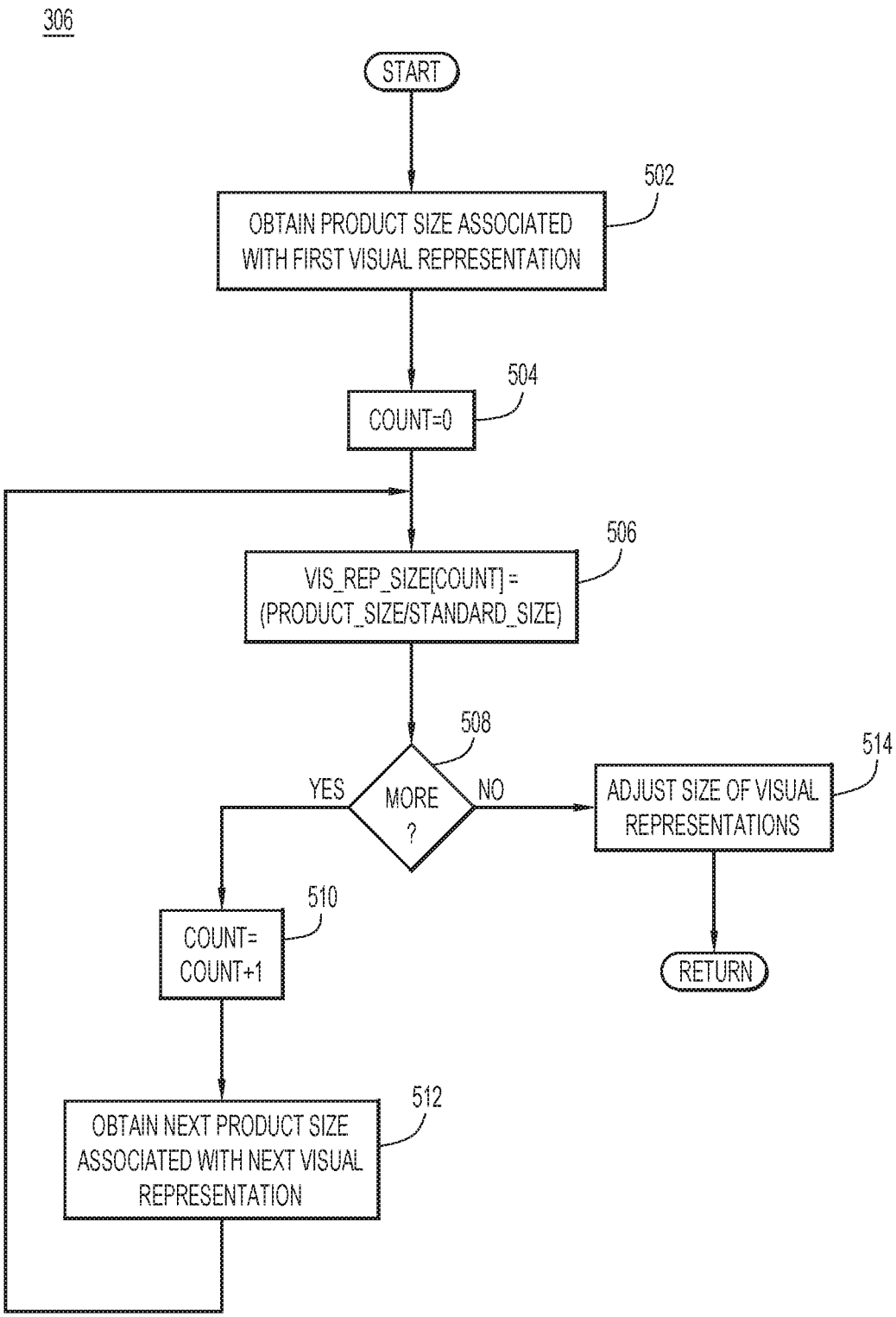
FIG. 5 is a flowchart that illustrates example processing for determining a size adjustment of visual representations of similar products relative to a standard size and adjusting the size of the visual representations according to an embodiment of the invention.

FIG. 5 is a flowchart illustrating example processing with respect to performing act 306 of FIG. 3 to adjust a size of a visual representation of a product relative to a standard size of the product. The process may begin by obtaining a product size associated with a first visual representation of the similar products (act 502) and setting a counter to zero (act 504).

VIS_REP_SIZE may be an array. Each element of the VIS_REP_SIZE array may include a value corresponding to a size adjustment for a respective size of a respective one of the similar products relative to the standard size of the similar products, which may be calculated relative to the standard size of the product by dividing the product size by the standard size (act 506).

A determination may then be made regarding whether there are any more product sizes with respect to a next visual representation (act 508). If so, the counter may be incremented by one (act 510) and a next product size associated with the next visual representation may be obtained (act 512). Acts 506-508 may then be performed again.

If, during act 508, no additional product sizes exist, then a size of each of the visual representations of the product may be adjusted relative to the visual representation of the standard size of the product (act 514).

Figure 6:
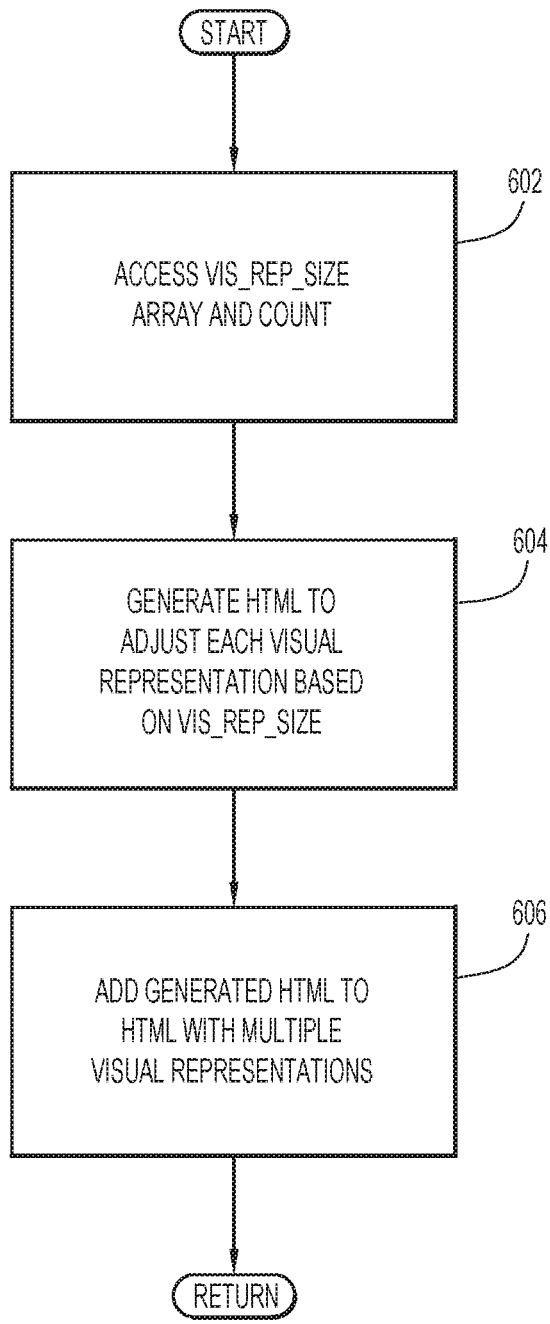
FIG. 6 is a flowchart that illustrates an example method for adjusting sizes of visual representations of similar products according to an embodiment of the invention.

FIG. 6 is a flowchart that illustrates example processing with respect to act 514 of FIG. 5. The process may begin by accessing the VIS_REP_SIZE array and the counter, COUNT (act 602). HyperText Markup Language (HTML) may then be generated to adjust the size of each of the multiple visual representations of the product (act 604) and the generated HTML may be appended to the HTML from server 106, which is to be provided to and rendered on a display device (act 606).

FIG. 7 illustrates example HTML that may be generated and appended to the HTML obtained from server 106 to be rendered on a display device. This example assumes that HTML from server 106, on which an online store website resides, includes three visual representations with respective IDs small SizeRepImage, medSizeRepImage, and largeSizeRepImage. Each of the three visual representations are assigned to respective variables smallSize, medSize, and largeSize. If the variable smallSize is defined and the visual representation corresponding to smallSize has a defined style, then a width of the corresponding visual representation is assigned a style width of 50 pixels. If the variable medSize is defined and the visual representation corresponding to medSize has a defined style, then a width of the corresponding visual representation is assigned a style width of 100 pixels. If the variable largeSize is defined and the visual representation corresponding to largeSize has a defined style, then a width of the corresponding visual representation is assigned a style width of 150 pixels.

FIG. 8 illustrates an example rendering of three visual representations of similar products such as, for example, shorts, on a display screen. Each of the visual representations may be sized relative to a standard size, which may correspond to a medium size in this example.

An alternative method for adjusting a size of visual representations may be implemented in various embodiments. Using the above example, in which three images are to be sized with a width of 50 pixels, 100 pixels and 150 pixels and the HTML from an online store's server is as follows:

<img src="url for Small image";>
<img src="url for medium image";>
<img src="url for large image";>

The HTML from the online store's server may be parsed to find the above HTML statements, which may then be modified to:

<img src="url for small image" style="width:50 px;>
<img src="url for medium image" style="width:100 px;>

```
<img src="url for large image" style="width:150 px;>
```
In another embodiment, another method may be used to adjust a size of visual representations. For example, assume that the standard size visual representation corresponds to the medium image, which is to be presented as being 25% of the width of the display screen. In this example, the small size image may be adjusted to be half the size of the standard size image and the large size image may be adjusted to be 1.5 times larger than the standard size image. The HTML from the online store may be parsed as in the previous example and modified as follows:
```
<img src="url for small image" style="width:12.5%;>
<img src="url for medium image" style="width:25%;>
<img src="url for large image" style="width: 37.5%;>
```
In other embodiments, numerous other methods may be used to adjust a size of visual representations to be rendered on a display device.

Some embodiments of the invention may include other features. For example, in some embodiments, hovering over a visual representation of a product may cause the visual representation to be displayed at a standard size, or other size, to improve visibility of the product. In other embodiments, information may be presented that explains why a visual representation of a product is displayed at a certain size. For example, the presented information could be, "This product is 50% smaller than the next size up." In further embodiments, differences in height and length of a size of a product with respect to a standard size of the product may be used to adjust a height and a width of a visual representation of a size of the product. In yet other embodiments, differences in alternative measures may be used to adjust a size of a visual representation with respect to a standard size of the product. Some embodiments of the invention may present a visual embellishment to one of the visual representations to indicate which of the multiple visual representations represents a standard size of the product. For example, the visual embellishment may include a star displayed over or near the visual representation of the standard size of the product. In other embodiments, a different visual embellishment may be displayed.

In various embodiments, size adjustments to visual representations of a product to be displayed may be performed while a shopper browses products of an online store website as well as when the shopper views a shopping cart when the shopper is about to make a purchase. In the various embodiments, the size adjustments to the visual representations provide the user with a sense of the relative sizes of similar products, thereby solving a problem specific to online shopping and the Internet.

It will be appreciated that the embodiments described above and illustrated in the drawings represent only a few of the many ways of implementing embodiments for visualizing relative sizes of a product in an online store.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for visualizing relative sizes of similar products in an online store, the method comprising:
    obtaining, by a computing device, at least two visual representations of the similar products from the online store;
    adjusting, by the computing device, a size of each of the visual representations to reflect its corresponding respective size relative to other sizes of the similar products, the adjusting of the size further comprising:
        scaling a size of the each of the visual representations based on the corresponding respective size of a respective similar product represented by the each of the visual representations in relation to a standard size of the similar products, and
        adjusting a pixel width and a pixel height of the each of the visual representations based on the scaled size represented by the each of the visual representations;
    providing, by the computing device, the size-adjusted visual representations for rendering on a display device; and
    providing, by the computing device for rendering on the display device, an explanation for one of the size-adjusted visual representations displayed at a certain size in response to a hovering over the one of the rendered size-adjusted visual representations.

2. The method of claim 1, wherein each of the visual representations is one from a group of an image, a video, and an animated visual clip.

3. The method of claim 1, wherein the relative sizes of the product are based on variations of one from a group of physical dimensions of the product and a weight of the product.

4. The method of claim 1, wherein the adjusting the size of the each of the visual representations based on the scaled size represented by the each of the visual representations further comprises:
    performing one from a group of:
        applying a respective Cascading Style Sheet style to each of the visual representations; and
        applying the scaling in-line.

5. The method of claim 4, wherein the applying the scaling in-line further comprises:
    applying a style attribute to received hypertext markup language to adjust the size of the each of the visual representations.

6. The method of claim 1, wherein the standard size of the product is a median size of respective sizes of the similar products represented by the visual representations.

7. The method of claim 1, further comprising:
    providing a visual embellishment of the visual representation representing the standard size of the similar products.

8. A system for visualizing relative sizes of similar products in an online store, comprising:
    at least one processor; and
    a memory connected to the at least one processor, the memory having instructions recorded therein for configuring the at least one processor to perform:
        obtaining at least two visual representations of the similar products from the online store;
        adjusting a size of each of the visual representations to reflect its corresponding respective size relative to other sizes of the similar products, the adjusting of the size further comprising:
            scaling a size of the each of the visual representations based on the corresponding respective size of a respective similar product represented by the each of the visual representations in relation to a standard size of the similar products, and
            adjusting a pixel width and a pixel height of the each of the visual representations based on the scaled size represented by the each of the visual representations;
        providing the size-adjusted visual representations for rendering on a display device; and
        providing, for rendering on the display device, an explanation for one of the size-adjusted visual representations displayed at a certain size in response to a hovering over the one of the rendered size-adjusted visual representations.

9. The system of claim 8, wherein the relative sizes of the similar products are based on one from a group of variations of physical dimensions of the product and variations of a weight of the product.

10. The system of claim 8, wherein the relative sizes of the similar products are based on variations of one from a group of physical dimensions of the product, a quantity of the product, and a weight of the product.

11. The system of claim 8, wherein the standard size of the similar products is a median size of respective sizes of the similar products represented by the visual representations.

12. The system of claim 8, wherein the adjusting the size of the each of the visual representations based on the scaled size represented by the each of the visual representations further comprises:
performing one from a group of:
applying a respective Cascading Style Sheet style to each of the visual representations; and
applying the scaling in-line.

13. A computer program product comprising at least one computer readable storage medium having computer readable program code embodied therewith for execution on at least one processor of a computer device, the computer readable program code being configured to be executed by the at least one processor to perform:
obtaining at least two visual representations of similar products from an online store;
adjusting a size of each of the visual representations to reflect its corresponding respective size relative to other sizes of the similar products, the adjusting of the size further comprising:
scaling a size of the each of the visual representations based on the corresponding respective size of the similar products represented by the each of the visual representations in relation to a standard size of the similar products, and
adjusting a pixel width and a pixel height of the each of the visual representations based on the scaled size represented by the each of the visual representations;
providing the size-adjusted visual representations for rendering on a display device; and
providing, for rendering on the display device, an explanation for one of the size adjusted visual representations displayed at a certain size in response to a hovering over the one of the rendered size-adjusted visual representations.

14. The computer program product of claim 13, wherein the relative sizes of the similar products are based on variations of one from a group of physical dimensions of the product and a weight of the product.

15. The computer program product of claim 13, wherein the adjusting the size of the each of the visual representations based on the scaled size represented by the each of the plurality of visual representations further comprises:
performing one from a group of:
applying a respective Cascading Style Sheet style to each of the visual representations; and
applying the scaling in-line.

16. The computer program product of claim 15, wherein the applying the scaling in-line further comprises:
applying a style attribute to received hypertext markup language to adjust the size of the each of the visual representations.

17. The computer program product of claim 13, wherein the computer readable program code is configured to be executed by the at least one processor to perform:
providing a visual embellishment of the visual representation representing the standard size of the similar products.

\* \* \* \* \*